Sept. 11, 1956  S. FRANKFURT  2,762,887
THERMAL RESPONSIVE DEVICE
Filed Sept. 8, 1951

INVENTOR.
SANDOR FRANKFURT
BY
Oberlin & Limbach
ATTORNEYS

United States Patent Office 2,762,887
Patented Sept. 11, 1956

2,762,887
THERMAL RESPONSIVE DEVICE

Sandor Frankfurt, Cleveland, Ohio, assignor to Champion Safe Top Co., Cleveland, Ohio, a corporation of Ohio Application September 8, 1951, Serial No. 245,661

17 Claims. (Cl. 200—139)

This invention relates as indicated to a thermal responsive device, and more particularly to such a device adapted to actuate an electric alarm signal or the like.

Various types of thermostats and like devices have been utilized in the past to actuate warning signals such as bells, gongs, sirens, lights, etc., when subjected to heat above a predetermined temperature. When installed in warehouses, dwelling houses and like establishments, it is very desirable that a large number of such thermostats be provided at properly spaced intervals in order that warning may be given of the outbreak of a fire before such fire has had an opportunity to spread. In the past, devices provided for this purpose have tended to be either unduly complex and expensive, militating against their use in large numbers or else, while relatively simple and inexpensive, have failed to be sufficiently reliable and convenient.

It is accordingly a principal object of my invention to provide a thermal responsive device or thermostat which will serve to actuate a warning signal or the like over a substantial temperature range, interrupting such signal when the temperature falls below the low point of such range.

Another object is to provide such device which will actuate a warning signal over a predetermined temperature range and if the maximum temperature of such predetermined range is reached will then continue to actuate such signal regardless of whether the temperature now rises still higher or drops below such range.

Another object is to provide such thermal responsive device which will be unusually sensitive and quick acting in response to a rise in temperature.

Still another object is to provide such device which will be small and unobtrusive, adapting it to use in homes.

A further object is to provide such device which, when automatically locked in operative position when the maximum predetermined temperature has been reached, may thereafter be manually disengaged to permit return of the parts to normal position.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
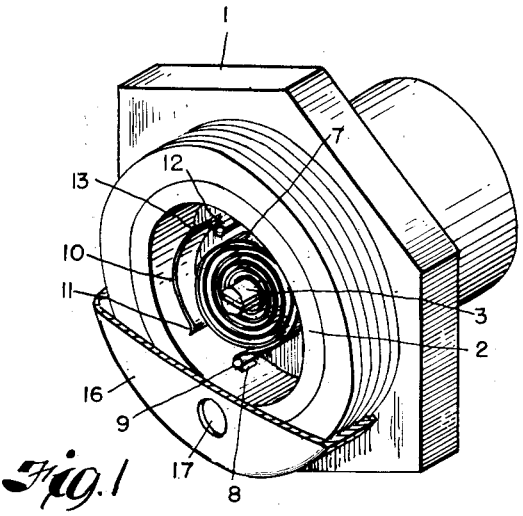
Fig. 1 is a perspective view of one embodiment of my new device with the cover partially broken away to disclose the internal arrangement of the same.
Figure 2:
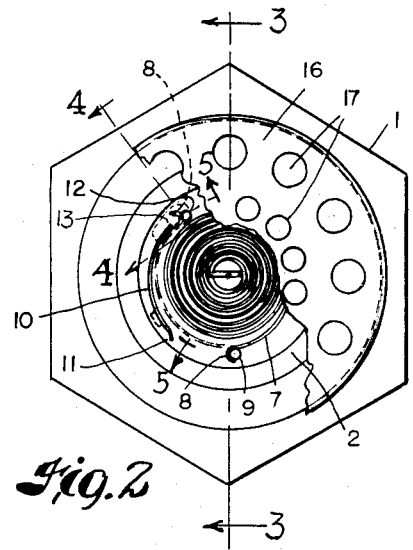
Fig. 2 is a top plan view of the device with a portion of the cover likewise broken away.

Now referring more particularly to said annexed drawing, the embodiment there illustrated may comprise an outer shell 1 of brass or other metal having an inner cup-shaped support of insulating plastic 2 press fitted therewithin. A central column 3 is secured to the bottom of cup 2 by means of nut 4 which may additionally be utilized to secure the connection 5 of electric lead 6 thereto.

Figure 3:
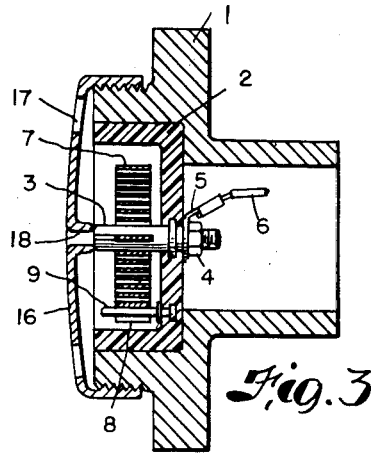
Fig. 3 is a transverse sectional view taken on the line 3—3 on Fig. 2.

Column 3 is split to receive the inner end of a spirally coiled thin flat thermostatic strip 7 of conductive metal. The outer end 8 of such strip is bent to form a generally radially outwardly directed projection adapted to engage post 9 at normal temperatures. Such post is mounted in the insulated cup 2 as best shown in Fig. 3.

An arcuate contact member 10 which may have an outwardly turned end portion 11 is mounted in cup 2 concentrically with center column 3 and helical strip 7, being spaced radially outwardly of the latter sufficiently to ensure contact with the outwardly projecting portion 8 of the strip when such strip lengthens on an arcuate path under the influence of heat, but at the same time permitting such end portion 8 to travel therealong in contact therewith in either direction. A post 12 is located slightly beyond the farther end of such arcuate contact 10 adapted to engage the outturned end 8 of strip 7 and prevent further movement of such end under the influence of heat. Moreover, such outturned end 8 will then also be prevented from returning along arcuate member 10 and back to its original position against post 9 since it will hook against the end 13 of arcuate member 10 to prevent such return. In effect, the outturned end 8 of strip 7 will be trapped between the end 13 of arcuate contact member 10 and post 12 if the temperature reaches a predetermined maximum.

Figure 4:
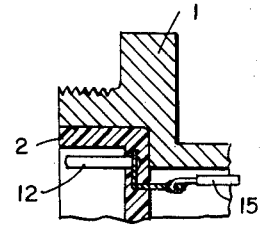
Fig. 4 is a fragmentary sectional view taken on the line 4—4 on Fig. 2.
Figure 5:
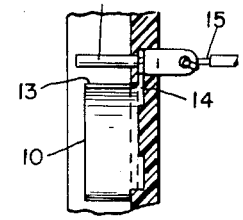
Fig. 5 is a similar view taken on the line 5—5 on Fig. 2.

As best shown in Figs. 4 and 5, contact member 10 and post 12, which will be of conductive metal such as brass, are electrically connected at 14 and an electric lead 15 is connected thereto. It will thus be seen that whenever the temperature rises sufficiently to cause strip 7 to move the outer end thereof into engagement with contact member 10 and/or post 12, an electric circuit may be completed from lead 6 through column 3, strip 7, contact members 10 and 12, and lead 15. As explained below, the closing of the circuit in this manner may conveniently be utilized to operate a warning signal or other electrical device.

The mechanism above described will desirably be protected by a thin cap or cover 16 of conductive metal such as copper or aluminum provided with a plurality of openings 17 therethrough to permit the circulation of air. Such cap will also desirably include an inwardly directed central stud 18 adapted to engage the end of column 3 when the cap has been screwed in place, the cap thereby being readily effective to conduct heat directly to such column and the spiral strip 7 gripped thereby. My new device is accordingly very sensitive and promptly responds to changes in temperature.

Figures 6, 8:
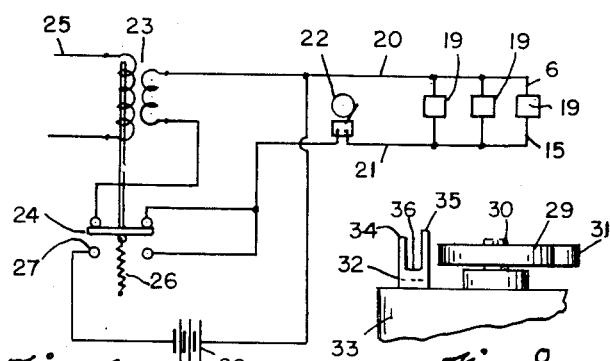
Fig. 6 is a typical wiring diagram illustrating one manner in which the device of my invention may be utilized.
Fig. 8 is a fragmentary elevational view of such modified form taken on the line 8—8 on Fig. 7.

In Fig. 6 there is shown a typical wiring diagram illustrating one manner in which my novel thermal responsive device may be employed. Thus, a plurality of such devices 19 may be connected across lines 20 and 21 having an electrically actuated warning means such as gong 22 included in series. A transformer 23 may ordinarily be provided to reduce the line voltage to six volts, for example, and such transformer may further be utilized as a solenoid to hold closed the normally open switch 24. Upon failure of power in main line 25, switch 24 will thereupon automatically open under the influence of spring 26, and switch 27 will be closed cutting a six-volt battery 28 into the circuit. Such battery thus serves as a stand-by in the event of a power failure.

The operation of my new device will be readily understood from the foregoing description. Spirally coiled strip 7 will normally be held in engagement with post 9 at usual temperatures. Arcuate contact member 10 may desirably be of a length and so located that when the temperature rises to 130° F., for example, strip 7 will have extended sufficiently initially to engage such contact member. When the temperature reaches 150° F., the end 8 of strip 7 will now have reached the farther end of member 10 and will engage stop 12 preventing such end 8 from moving out of electrical contact. In the event of a further rise in temperature, the spirally coiled strip 7 will, of course, merely bulge somewhat outwardly. Since the circuit is closed whenever strip 7 makes contact with member 10 of any one of the thermal responsive devices, the warning signal means such as gong 22 will at once be actuated and will continue to operate until end 8 of strip 7 returns out of contact with member 10. Of course, if such end 8 of strip 7 has become engaged between the farther end 13 of member 10 and stop 12, the electrical contact will be maintained despite further temperature variation up and down until such end 8 has been manually released and permitted to return against stop 9.

It will thus be seen that my new device may be arranged to actuate a warning signal when a certain predetermined temperature has been reached and to continue such signal over a predetermined temperature range. Unless the upper point of such range is reached, the signal will automatically be discontinued when the temperature drops below a selected minimum. On the other hand, once a selected maximum temperature has been attained, the contact members are automatically locked together and the warning signal will continue regardless of subsequent temperature changes. It is apparent that this means that if the thermal responsive device is subjected to a high temperature as by direct contact with an open flame, for example, the warning signal will continue even though the flame may shortly leave the device and take its way elsewhere. It is further obvious that my new device may be relatively small and inconspicuous, not more than one inch in diameter, and it is accordingly well adapted for use in homes, offices, etc., without detriment to the appearance of the establishment.

Figure 7:
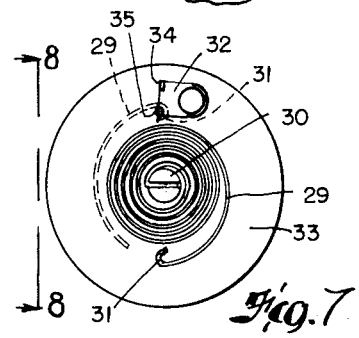
Fig. 7 is a top plan view of a modified form of my device.

Referring now to Figs. 7 and 8 of the drawing, the embodiment of my invention there illustrated is generally similar to that above described and comprises a flat spirally coiled thermostatic element 29 secured at its inner end to fixed post 30, ordinarily of copper, to which an electric lead may be connected. The outer free end 31 of such spiral element is bent or recurved in the same general manner as end 8 of element 7, but preferably in an inward direction as shown. A combined gate member and stop 32 of electrically conductive metal is mounted on the same insulating base 33 carrying post 30 and is adapted to be connected to an electric lead similarly to elements 10 and 12.

Member 32 is positioned to be contacted by spiral element 29 when the latter is extended due to application of heat, such element passing through the "gate" formed by upstanding prongs 34 and 35 arranged so that such element bears against the inner surface of prong 35 and preferably also the bottom portion 36 of the "gate," making electrical contact therewith. An alarm or other device may be operated by the closing of a circuit thereby in the same general manner as described above. Such electrical contact is of course maintained during further elongation of element 29 due to a further rise in temperature, but upon cooling and consequent contraction of such element hook portion 31 will engage prong 35 to maintain the electrical contact until manually released. Such hooked portion is shaped to cam itself past such prong and through the "gate" when moving in the other direction.

My new thermal responsive device may be utilized to actuate any desired mechanism including gauges, solenoids, solenoid-operated valves, and the like but is particularly adapted for the actuation of alarm systems. Obviously, devices for automatic release of fire-extinguishing agents, etc., may be similarly actuated. An ordinary alarm clock, preferably of the electric type, may be connected for actuation by closing of the circuit of my thermal responsive device.

In the embodiment shown in Figs. 7 and 8, when the hook-like end of the thermostatic strip first engages the fixed contact member, thereby closing the circuit, some additional force will be required to cam such end past such member. Thus, if the heat is insufficient or shortly dissipated, the electrical contact may be broken due to contraction of the strip before the end becomes lockingly interengaged with the contact member. In both forms, the resilient mounting of the thermostatic member makes feasible the interlocking of the two contact members as explained. By making at least one of such members bodily movable relatively to the other it is possible to accommodate the subsequent contraction despite such interlocking. It is apparent that the fixed contact member could also be resiliently mounted, if desired.

The "gate" formed by prongs 34 and 35 may desirably be narrow enough so that the curved end 31 of element 29 must be very slightly compressed in order that it may be forced therethrough, thereby ensuring that it cannot escape prong 35 upon subsequent cooling and contraction of such element. In practice, however, it will generally be found that hook-like end 31 will catch on prong 35 when element 29 contracts even if the precautionary prong 34 be not provided. It may, of course, readily be manually disengaged to break the circuit.

In the Fig. 1–5 embodiment, when the end 8 of element 7 abuts against post 12, further expansion of element 7 will cause the latter to bulge outwardly and press against member 10, making electrical contact therewith, so that it is not really essential that post or stop 12 be connected to lead 15 as shown, although this is preferred.

It will be seen that an important feature of my invention is the provision of a heat expansible element operative when expanded in response to a predetermined temperature to actuate signal means and when returned to unexpanded condition on cooling to deactivate such signal means, together with manually releasable means automatically operative to prevent return of such element out of signal-actuating position. In a simple form, such signal means may be mechanically energized as in the case of the ordinary alarm clock and my heat expansible element utilized directly to trip the alarm. By providing a catch to hold such element in extended position, continued operation of the alarm is ensured until manually released or the alarm runs down.

Other modes of applying the principle of the invention may be employed, change being made as regards the details described, provided the features stated in any of the following claims or the equivalent of such be employed.

I therefore particularly point out and distinctly claim as my invention:

1. In a thermal responsive device for actuating an electric alarm signal or the like, a thermostatic metal strip mounted on an insulating support, an electric lead to such strip, said strip being adapted to lengthen under the influence of heat, an electric contact member adapted to be engaged by said strip when thus heated and extended but normally out of contact therewith, means adapted automatically to maintain said strip and contact member in such engagement, and an electric lead to said contact member, said leads adapted to be in circuit with one another and said strip adapted to conduct current therethrough when in engagement with said member.

2. In a thermal responsive device for actuating an electric alarm signal or the like, a thin spiral thermostatic metal strip, an insulated support rigidly mounting the inner end of such spiral, an electric lead to such inner end, a projection on the outer end of said spiral strip, said strip being adapted to lengthen and shorten with changes in temperature, the outer end of said strip following an arcuate path of movement, a stop adapted to engage said projection to limit such arcuate movement of such end in one direction upon cooling of said strip, a fixed arcuate contact member circumferentially spaced from said stop and adapted to make electrical contact with said outer end of said strip over a substantial temperature range as said end moves therealong, a second stop circumferentially spaced from and closely adjacent the farther end of said arcuate contact member adapted to prevent substantial movement of said end of said strip beyond said contact member when further heated, said projection being adapted releasably to engage such farther end of said arcuate contact member to prevent return of said strip end upon subsequent cooling of said strip, and a second lead to said contact member and second stop, said leads adapted to be in circuit with one another and said strip adapted to conduct current therethrough when in engagement with said member.

3. In a thermal responsive device for actuating an electric alarm signal or the like, a thin spiral thermostatic metal strip, an insulated support rigidly mounting the inner end of such spiral, an electric lead to such inner end, a projection on the outer end of said spiral strip, said strip being adapted to lengthen and shorten with changes in temperature, the outer end of said strip following an arcuate path of movement, a stop adapted to engage said projection to limit such arcuate movement of such end in one direction upon cooling of said strip, a fixed arcuate contact member spaced from said stop and adapted to make electrical contact with said outer end of said strip over a substantial temperature range as said end moves therealong, a second stop closely adjacent the farther end of said arcuate contact member adapted to prevent substantial movement of said end of said strip beyond said contact member when further heated, said projection being adapted releasably to engage such farther end of said arcuate contact member to prevent return of said strip end upon subsequent cooling of said strip, a second lead to said contact member and second stop, and a perforated cover of conductive metal overlying said strip and associated elements.

4. In a thermal responsive device for actuating an electric alarm signal or the like, an insulating support, a central column of conductive metal mounted thereon, a thin spiral thermostatic metal strip coiled around said column and having its inner end rigidly secured thereto, the outer end of said strip being bent outwardly, said strip being adapted to lengthen and shorten with variations in temperature, the outer end of said strip following an arcuate path, a stop adapted to engage said outwardly bent end of said strip to limit such arcuate movement thereof in one direction upon cooling of said strip, a fixed arcuate electrical contact member circumferentially spaced from said stop and generally concentric to said spiral strip adapted to make electrical contact with said outer end of said strip over a substantial temperature range when said outer end thus moves therealong due to expansion of said strip in response to an increase in temperature, means adapted to prevent travel of said end beyond the farther end of said arcuate contact member despite a further rise in temperature, the outwardly bent end of said strip furthermore being adapted to engage such end of said contact member to prevent return of said strip end upon subsequent cooling of said strip, and electrical connections to said column and said contact member respectively adapted to be in circuit with one another, said strip adapted to conduct electric current therethrough when in engagement with said member.

5. In a thermal responsive device for actuating an electric signal or the like, a central support, a thin spiral thermostatic metal strip coiled thereabout with its inner end rigidly secured thereto, said strip being adapted to lengthen and shorten an arcuate path under the effect of temperature variation, means adapted to limit such movement of the outer end of said strip in one direction upon cooling of the strip, an electrical contact member adapted to engage such end of said strip during movement of such end over a selected temperature range, means adapted to secure such end against return movement when a position has been reached corresponding to a predetermined elevated temperature, to maintain such end in contact with said member an electric lead to said central support and an electric lead to said member, said strip adapted to conduct the electric current therethrough when in engagement with said member.

6. In a thermal responsive device, a heat expansible contact member, a fixed contact member adapted to engage said first member when expanded, said members being electrically conductive, electrical leads connected respectively to said members and means automatically operative to lock said members together to maintain contact upon subsequent cooling of said first member, said leads adapted to be in circuit with one another.

7. In a thermal responsive device, a heat expansible thermostatic contact member, a second contact member adapted to be engaged by said first member in sliding contact over a substantial predetermined temperature range, said members being electrically conductive and having electric leads connected respectively thereto, and latch means adapted to lock said members together against return movement when said first member has expanded to a point corresponding to a predetermined temperature to maintain such contact upon subsequent cooling of said first member.

8. In a thermal responsive device, a heat expansible thermostatic electric contact member, a second electric contact member normally spaced from and out of contact with said first member but adapted to engage said first member when the latter has expanded a predetermined amount and thereafter to maintain electrical contact therewith, and means automatically operative to lock said members together against return of said first member out of contact with said second member upon subseqeunt cooling.

9. In a thermal responsive device, a heat expansible electrically conductive thermostatic metal strip, a fixed electric contact member normally spaced from and out of contact with said strip but adapted to engage said strip when the latter has expanded a predetermined amount under the influence of applied heat, said strip being adapted to slide past said member during further expansion while maintaining electrical contact therewith, and locking means on the end of said strip adapted to engage said contact member upon contraction of said strip to prevent return of said strip out of contact with said member.

10. In a thermal responsive device, a resiliently mounted heat expansible electric contact member, a second electric contact member normally spaced from and out of contact with said first member but adapted to engage said first member when the latter has expanded a predetermined amount under the influence of applied heat, said first member being adapted to slide past said second member during further expansion while maintaining electrical contact therewith, and locking means on said first member adapted to engage said second member upon contraction of said first member to prevent return of said first member out of contact with said second member.

11. In a thermal responsive device, two normally spaced electric contact members, at least one of said members being resiliently mounted and at least one of said members being expansible under influence of heat to contact the other said member, and means automatically operative to interengage said members to prevent return of said expansible member out of contact upon subsequent contraction of said latter member.

12. In a thermal responsive device having two normally spaced electric contact members, at least one said member being bodily movable toward and away from the other said member and at least one of said members being expansible under influence of heat to contact the other said member, means automatically operative to interengage said members to prevent return of said expansible member out of contact upon subsequent contraction of said latter member.

13. In an alarm system including an electrically operated signal and a source of electric current; a thermal responsive device having two normally spaced electric contact members adapted when brought together to close a circuit to actuate said signal, at least one of said members being resiliently mounted and at least one of said members being expansible under influence of heat to contact the other said member, and means automatically operative to interengage said members to prevent return of said expansible member out of contact upon subsequent contraction of said latter member.

14. In an alarm system including an electrically operated signal and a source of electric current; a thermal responsive device having two normally spaced electric contact members adapted when brought together to close a circuit to actuate said signal, one of said members being expansible under the influence of heat to contact the other said member, and means automatically operative to interengage said members to prevent separation thereof out of contact upon subsequent cooling of said expansible member.

15. In a thermal responsive device, a central support, a thin resilient spiral metal thermostatic strip coiled thereabout with its inner end rigidly secured thereto, said strip being expansible under the influence of heat, a fixed electric contact member normally spaced from the outer end of said strip but adapted to engage said strip upon predetermined extension of the latter under the influence of heat and to maintain such engagement during further expansion, means adapted to interengage said strip and contact member to prevent return of said strip out of contact with said member upon subsequent cooling of said strip, said strip being electric current conductive and an electric lead connected to said central support.

16. In a thermal responsive device, a central support, a thin resilient spiral metal thermostatic strip coiled thereabout with its inner end rigidly secured thereto, said strip being expansible under the influence of heat, a fixed electric contact member normally spaced from the outer end of said strip but adapted to engage said strip upon predetermined extension of the latter under the influence of heat and to maintain such engagement during further expansion, and hook means on the outer end of said strip adapted to engage said contact member to prevent return of said strip out of contact with said member upon subsequent cooling of said strip, said strip being electric current conductive and an electric lead connected to said central support.

17. In a thermal responsive device, a central support, a thin resilient spiral metal thermostatic strip coiled thereabout with its inner end rigidly secured thereto, said strip being expansible under the influence of heat, a fixed electric contact member normally spaced from the outer end of said strip but adapted to engage said strip upon predetermined extension of the latter under the influence of heat and to maintain such engagement during further expansion, said contact member comprising two spaced elements between which said strip is adapted to slide in contact with at least one thereof, and hook means on the outer end of said strip adapted to contact but cam past said contact member as said strip elongates but to interengage said contact member upon subsequent cooling of said strip to prevent return of the latter out of electrical contact therewith, said strip being electric current conductive and adapted to conduct the electric current therethrough between said post and member.

References Cited in the file of this patent

UNITED STATES PATENTS

| | | |
|---|---|---|
| 661,555 | Ross | Nov. 13, 1900 |
| 1,117,646 | Durbin et al. | Nov. 17, 1914 |
| 1,146,637 | Massa | July 13, 1915 |
| 1,259,577 | Wolf | Mar. 19, 1918 |
| 1,388,111 | Harrington | Aug. 16, 1921 |
| 2,060,671 | Henning | Nov. 10, 1936 |
| 2,220,752 | Blanc | Nov. 5, 1940 |
| 2,249,259 | Shaw | July 15, 1941 |
| 2,414,513 | Ellis et al. | Jan. 21, 1947 |
| 2,498,814 | Little et al. | Feb. 28, 1950 |
| 2,598,808 | Ledin | June 3, 1952 |
| 2,650,969 | Zimmerman | Sept. 1, 1953 |